H. SLOAN.
APPARATUS FOR THE MANUFACTURE OF PLATE ICE.
APPLICATION FILED SEPT. 29, 1906.
994,881.
Patented June 13, 1911.
3 SHEETS—SHEET 1.
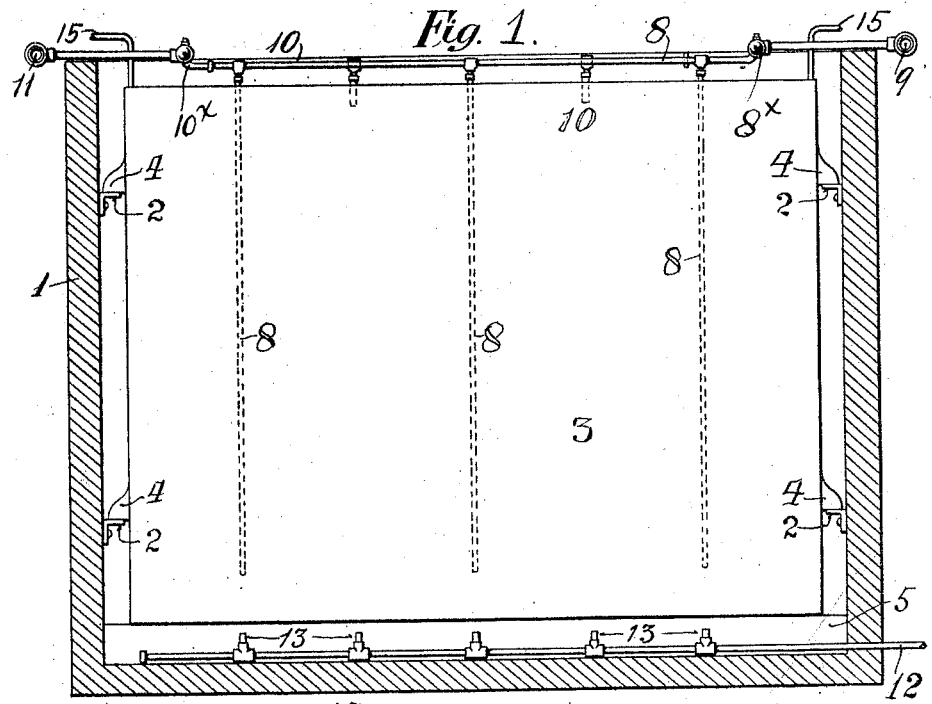
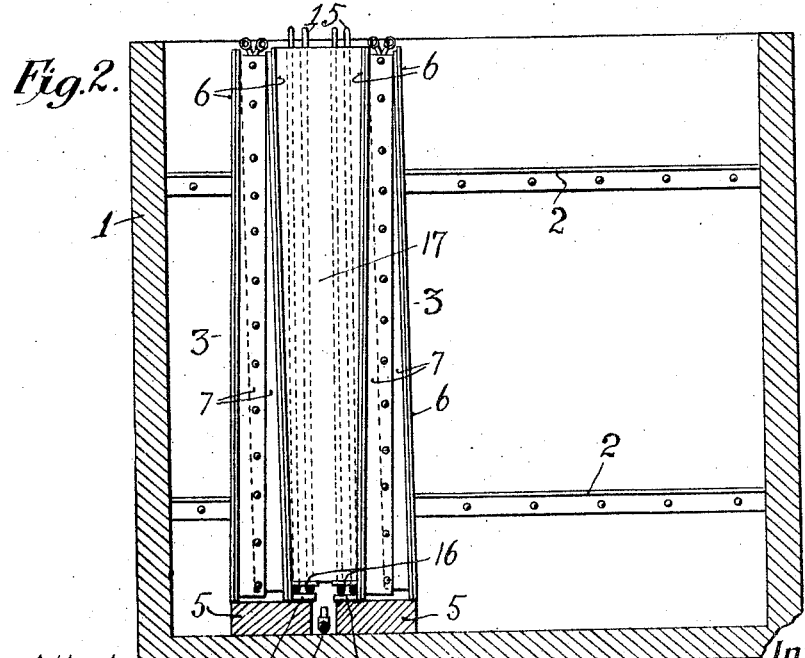

H. SLOAN.
APPARATUS FOR THE MANUFACTURE OF PLATE ICE.
APPLICATION FILED SEPT. 29, 1906.
994,881.
Patented June 13, 1911.
3 SHEETS—SHEET 2.
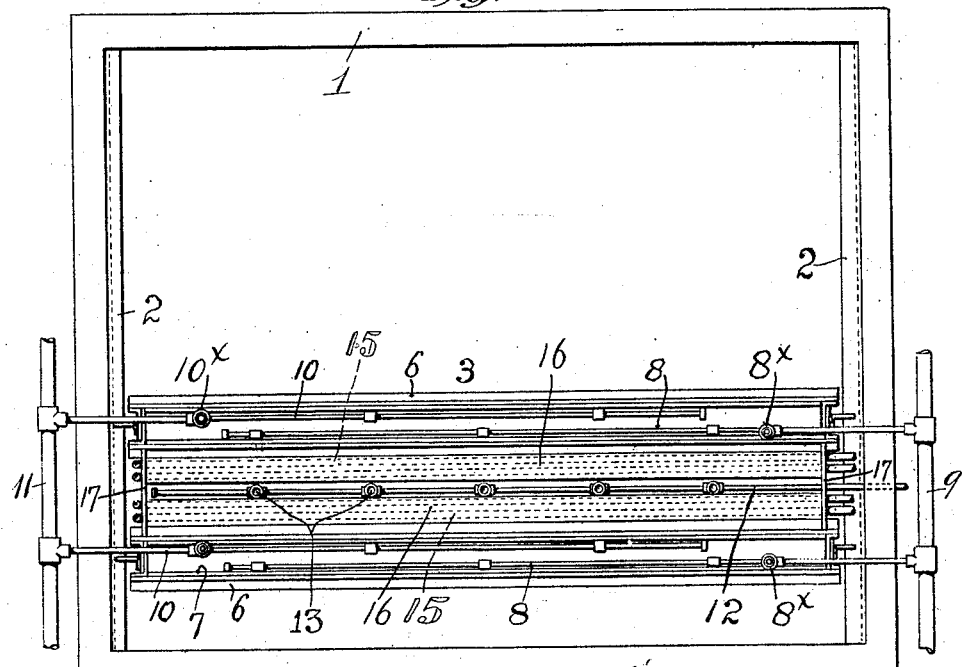
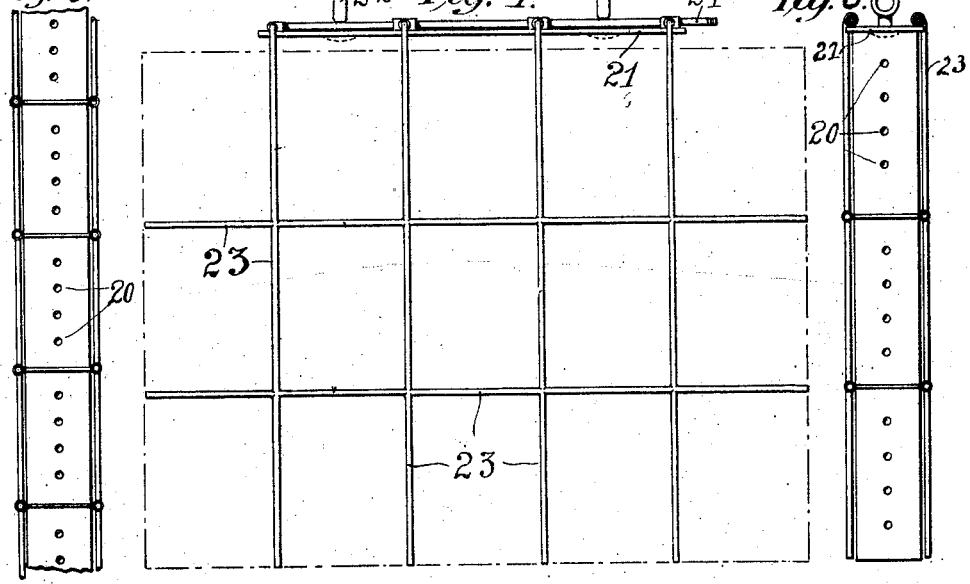
Attest:
Inventor:
Harry Sloan,
by R.W. Barkley, his Atty.

H. SLOAN.
APPARATUS FOR THE MANUFACTURE OF PLATE ICE.
APPLICATION FILED SEPT. 29, 1906.
994,381.
Patented June 13, 1911.
3 SHEETS—SHEET 3.
Fig. 8.  Fig. 9.  Fig. 10.
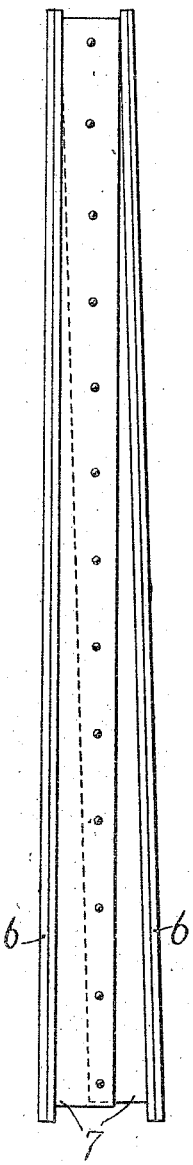
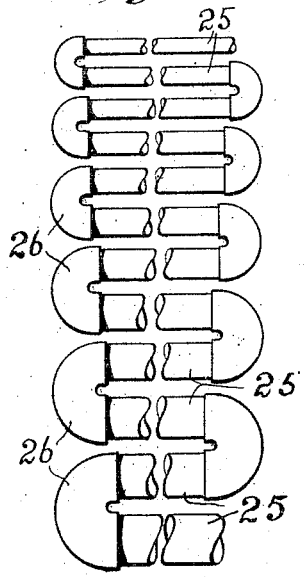
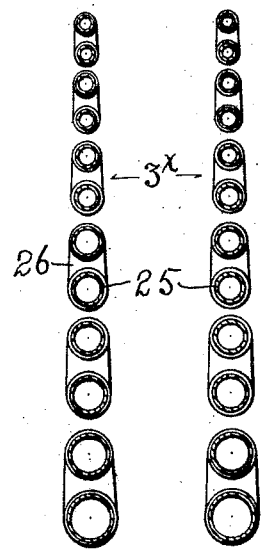
Fig. 7.
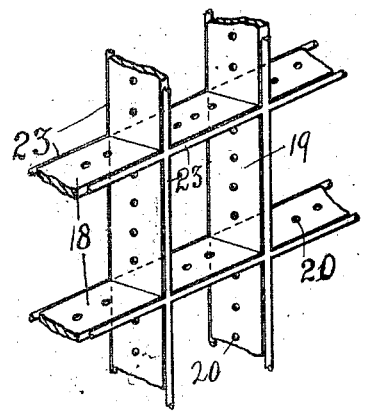
Attest:
Inventor:
Harry Sloan,
by Richard W. Barkley
his Atty.

UNITED STATES PATENT OFFICE.

HARRY SLOAN, OF BROOKLYN, NEW YORK, ASSIGNOR, BY MESNE ASSIGNMENTS, TO NEW JERSEY PATENT HOLDING COMPANY, A CORPORATION OF NEW YORK.

APPARATUS FOR THE MANUFACTURE OF PLATE-ICE.

994,881.  Specification of Letters Patent.  Patented June 13, 1911.

Application filed September 29, 1906. Serial No. 336,713.

*To all whom it may concern:*

Be it known that I, HARRY SLOAN, a citizen of the United States, and a resident of the borough of Brooklyn, in the county of Kings and State of New York, have invented a certain new and useful Improvement in Apparatus for the Manufacture of Plate-Ice, of which the following is a specification.

The invention relates to apparatus for the manufacture of plate ice and is an improvement upon the apparatus disclosed in U. S. Letters Patent No. 682,659, granted to W. J. Woodcock, September 17, 1901, whereby plate ice is produced by freezing water at a temperature below 0° Fahrenheit, in contact with a freezing plate having a yielding surface. In my present apparatus I preferably employ such a freezing plate, and in connection therewith the construction more particularly hereinafter claimed whereby it is possible to secure a more economical production of said plate ice.

In the accompanying drawings—Figure 1 is a vertical transverse sectional view showing a vat, a freezing-plate, and certain accessories; Fig. 2 is a vertical sectional view, showing a pair of freezing-plates, the view being taken just inside of the vat-wall; Fig. 3 is a plan view of the same; Fig. 4 is a side elevation, Fig. 5 is an end elevation, and Fig. 6 is a partial bottom-view, of an ice-plate lifting- and dividing-grid; Fig. 7 is a perspective view of part of said grid; Fig. 8 is an end view of a wedge-shaped freezing-plate; Fig. 9 is a side elevation of a modified form of wedge-shaped freezing-plate; and Fig. 10 is a vertical sectional view through, or transversely of, two such modified plates.

The tank 1 containing the water to be frozen, has on its vertical walls, ledges 2, upon which rest the arms 4, projecting from the freezing plates 3, which plates may also be supported on blocks 5 of wood. Each freezing plate consists of a sheet of metal 6, having on its rear side projecting angle bars 7, which bars are bolted together as best shown in Fig. 8, to produce a wedge shaped box.

Fluid refrigerant passes from a supply main 9, through pipes 8, to the lower part of the interior of the freezing plates 3, and escapes at the upper portion of said plates by the pipes 10, which connect with main 11. In the pipes 8 and 10 may be arranged flexible joints 8ˣ and 10ˣ.

When the two freezing plates 3 are in working position a wedge shaped space wider at the top than at the bottom is formed between them, as shown in Fig. 2. Secured to the bottom of the opposing freezing surfaces of the plates are parallel flanges 14, 16, between which lie the pipes 15, which extend up on each side of the space between the plates. Movable end plates 17 conforming to the shape of said space may be inserted therein to protect the vertical portions of said pipes. The freezing surfaces of the plates 3, the flanges 14 and the movable end plates 17, together form a receptacle in which the ice cake is formed.

In the lower part of the tank and lying between the supporting blocks 5 is a pipe 12, having upwardly turned nozzles 13. This pipe may connect with any source of sterilizing fluid, such as ozonized air which escapes in jets from the nozzles 13, and so passes upward in the space between the freezing plates.

The operation is as follows:—The ice is formed between the freezing plates 3, beginning at the surface of each plate and increasing in thickness until the faces of the respective cakes meet and unite. Meanwhile, jets of ozonized air are delivered from the nozzles 13 into the space between the plates, thus sterilizing the ice during its formation. As soon as the said space is filled with the ice cake, any warm fluid is passed through the pipes 15 to thaw the cake at its edges clear of plates 17 and flanges 16, and thawing off from the freezing surfaces of plates 3 may also be effected in any known way, as for example, by causing a relatively warm liquid to circulate through said plates. By reason of the decreasing thickness of the wedge shaped space between the plates 3, the thawed off cake can easily be lifted out by any suitable means; while the mounting of the plates 3 on the sliding arms 4 permits said plates to yield slightly to internal pressure exerted by the ice as it forms upon them and after the uniting of the faces of the two ice cakes. In order to enable the completed cake to be conveniently divided into smaller blocks, I provide a grid composed of plates 18 and 19 which are perforated, as at 20, to allow of the circulation of the aforesaid sterilizing agent. The plates 18 and 19 are of such widths that, when the grids are properly centered in the spaces between the freezing-plates, they will be separated from said freezing-plates by a considerable distance, as an inch or more. The vertical plates 19 are united at their upper ends by a plate or other metal tie 21, to which eyes 22 are attached to receive the hooks of hoisting tackle. It will be noted that the plates 18 19 form means for hastening the process of freezing in that they conduct heat along planes transverse to the forming ice-plates to points near or adjacent to the freezing-plates.

In order to loosen the ice from the grid, the latter may be struck with mallets or other means, and the operation may be facilitated by heating the ice along the planes of the plates forming the grid, as by passing live steam through pipes 23, which are brazed, soldered, or otherwise attached to the edges of said plates 18 19. The said pipes 23 should not have an outside diameter greater than the thickness of the plates 18 19. The reference 24 designates a supply pipe for the live steam, the upper ends of the pipes 23 being connected with said supply pipe 24, and the other ends of the pipes 23 being plugged during the freezing of the ice, and being unplugged before the steam is turned on, so that the steam will have free passage through said pipes 23.

A modified form of freezing plate $3^x$ is illustrated in Figs. 9 and 10, wherein are shown pipes 25 and arc-couplings 26, the said pipes decreasing in outside diameter from the bottom of the plate to the top thereof, though two or more successive pipes may have substantially the same diameter. These plates $3^x$, as well as the plates 3, are of thicknesses such that, at any point intermediate the top and the bottom of the freezing-plate, the thickness of the plate is not greater than is the thickness at any lower point. The ice is loosened from the plates $3^x$ in the manner hereinbefore mentioned.

What I claim as new and desire to secure by Letters Patent of the United States is—

1. The combination with a tank, of two hollow wedge-shaped freezing plates located therein and having their freezing surfaces opposite to one another and spaced apart and oppositely inclined to form a receptacle in which to freeze a wedge-shaped cake of ice, said freezing plates being yieldingly mounted in said tank, and means forming end and bottom walls of said receptacle.

2. The combination with a tank, of two freezing plates yieldingly mounted in said tank and having their freezing surfaces disposed opposite one another and at such distance apart as to permit the formation of a cake of ice filling the intervening space, plates forming end and bottom walls of the space, and a grid located between said freezing surfaces and in said receptacle substantially as described.

3. The combination with a tank, of two hollow wedge-shaped freezing plates yieldingly mounted in said tank and having their freezing surfaces disposed opposite one another and spaced apart to permit of the formation of an ice cake filling the intervening space, means forming end and bottom walls for the receptacle, said walls and the freezing surfaces of the plate together forming the receptacle in which the freezing occurs, and a grid located between said freezing surfaces.

4. The combination with a tank, of two wedge-shaped freezing plates having their freezing surfaces disposed opposite one another, and at such distance apart as to permit the formation of an ice cake filling the intervening space, and a perforated grid located between said freezing plates, substantially as described.

5. The combination with a tank, of two wedge-shaped freezing plates yieldingly mounted in said tank and having their freezing surfaces disposed at such distance apart as to permit the formation of an ice cake filling the intervening space, means forming end and bottom walls of said space, and means for delivering jets of sterilizing fluid in the said receptacle.

6. The combination of a tank, two freezing plates having their freezing surfaces disposed opposite one another and at such distance apart as to permit the formation of an ice cake filling the intervening space, a grid between said freezing plates and ducts supported on the edges of the partition walls of said grid.

7. The combination of a tank, two vertical freezing plates therein having their freezing surfaces disposed opposite one another and at such distance apart as to permit the formation of an ice cake filling the intervening space, inwardly projecting flanges near the lower edges of said surfaces, two vertical plates extending transversely between and respectively located near the vertical edges of said surfaces, and ducts on the exterior of said flanges and transverse plates; the said freezing surfaces, flanges and transverse plates forming a chamber wherein the ice cake is produced.

Signed at New York in the county of New York and State of New York this 22nd day of Sept., A. D. 1906.

HARRY SLOAN.

Witnesses:
A. T. STOUTENBURGH,
R. W. BARKLEY.